(12) United States Patent
Nakazawa

(10) Patent No.: US 8,239,920 B2
(45) Date of Patent: Aug. 7, 2012

(54) AUTHENTICATION SYSTEM AND METHOD

(75) Inventor: Ryota Nakazawa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 686 days.

(21) Appl. No.: 12/414,451

(22) Filed: Mar. 30, 2009

(65) Prior Publication Data

US 2009/0260078 A1   Oct. 15, 2009

(30) Foreign Application Priority Data

Apr. 14, 2008   (JP) ................... 2008-104636

(51) Int. Cl.
*H04L 9/32* (2006.01)
(52) U.S. Cl. ............................. 726/2; 726/19
(58) Field of Classification Search ............... 726/2–5, 726/16–21; 713/182–186; 382/115–118, 382/124

See application file for complete search history.

(56) References Cited

U.S. PATENT DOCUMENTS

| | | | |
|---|---|---|---|
| 5,594,227 A | 1/1997 | Deo | |
| 5,936,543 A | 8/1999 | Matsumoto | |
| 7,039,812 B2 * | 5/2006 | Kawan et al. | 713/186 |
| 7,111,172 B1 * | 9/2006 | Duane et al. | 713/182 |
| 7,454,794 B1 * | 11/2008 | Hibberd | 726/27 |
| 2005/0055584 A1 | 3/2005 | Tani | |

FOREIGN PATENT DOCUMENTS

| | | |
|---|---|---|
| EP | 1 515 330 | 3/2005 |
| JP | 05027861 | 2/1993 |
| JP | 05-204766 | 8/1993 |
| JP | 08289005 | 11/1995 |
| JP | 09-311896 | 12/1997 |
| JP | 2000-076402 | 3/2000 |
| JP | 2005-84968 | 3/2005 |
| JP | 2006-146433 | 6/2006 |
| JP | 2006-185389 | 7/2006 |

OTHER PUBLICATIONS

Office Action from Japanese Patent Application No. 2008-104636, mailed on May 19, 2010.

* cited by examiner

*Primary Examiner* — Hosuk Song
(74) *Attorney, Agent, or Firm* — Morrison & Foerster LLP

(57) ABSTRACT

An authentication apparatus and technology operable to change a response time based on a degree of authentication failure is disclosed. A degree of authentication failure can be determined in response to an authentication failure. A response time such as an authentication response time can be changed based on the degree of authentication failure. Intervals between entries of a password may be increased logarithmically based on the number of failed login attempts to deter unauthorized access.

18 Claims, 4 Drawing Sheets

AUTHENTICATION SYSTEM AND METHOD

CROSS-REFERENCE TO RELATED APPLICATION

The present application claims priority under 35 U.S.C. §119 to Japanese Patent Application No. 2008-104636, filed on Apr. 14, 2008. The content of which is incorporated herein by reference in its entirety.

FIELD OF INVENTION

Embodiments of the present disclosure relate generally to an authentication apparatus performing authentication processing, and more particularly relates to an authentication method for the authentication apparatus.

BACKGROUND OF THE INVENTION

In recent years, many electronic devices have been specialized for personal use. For example, mobile phones are personalized for music choices, ring tones, and the like. Users of the personal electronic devices may also have personal information such as phone numbers, credit card numbers, addresses, and the like stored on the personal electronic devices.

To insure privacy and security of personal services and information, user authentication may be used. For example, usage may be restricted to an authorized user or a set of authorized users by using a password. In this manner, a specified function of an electronic apparatus cannot be used unless authentication by password is successfully performed. Existing security measures may block password inputs after a user makes a few incorrect inputs. However, an authorized user may input a few mistaken password entries before inputting the password correctly. As a result, the authorized user may be blocked from inputting passwords before being able to input the password correctly. This puts a burden on the authorized user. Therefore, there is a need for authentication technologies that minimize burdens on the authorized user and deter unauthorized users.

SUMMARY

An authentication apparatus and technology operable to change a response time based on a degree of authentication failure is disclosed. A degree of authentication failure can be determined in response to an authentication failure. A response time such as an authentication response time can be changed based on the degree of authentication failure. Intervals between entries of a password may be increased by a logarithmic amount based on the number of failed login attempts to deter unauthorized access.

A first embodiment comprises an authentication apparatus. The authentication apparatus comprises an operation module operable to accept input of authentication information, and an authentication module operable to authenticate the authentication information. The authentication apparatus further comprises a determination module operable to determine a degree of authentication failure in response to one or more authentication failures indicated by the authentication module, and a response module operable to change a response time based on the degree of failure. The response time is a time to respond to an operation of the operation module.

A second embodiment comprises an authentication method. The method comprises accepting input of authentication information into an operation module, and authenticating the authentication information to determine whether one or more authentication failures occur. The method further comprises determining a degree of authentication failure in response to the one or more authentication failures, and changing a response time depending on the degree of authentication failure. The response time is a time to respond to an operation of the operation module.

A third embodiment comprises a computer readable medium for an authentication apparatus. The computer readable medium comprises program code for accepting input of authentication information into an operation module, and authenticating the authentication information to determine whether one or more authentication failures occur. The computer readable medium further comprises program code for determining a degree of failure in response to the one or more authentication failures, and changing a response time depending on the degree of failure. The response time is a time to respond to an operation of the operation module.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the disclosure. The figures are provided to facilitate understanding of the disclosure without limiting the breadth, scope, scale, or applicability of the disclosure. The drawings are not necessarily made to scale.

DETAILED DESCRIPTION OF EXEMPLARY EMBODIMENTS

The following description is presented to enable a person of ordinary skill in the art to make and use the embodiments of the disclosure. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, embodiments of the present disclosure are not intended to be limited to the examples described herein and shown, but are to be accorded the scope consistent with the claims.

Embodiments of the disclosure are described herein in the context of a practical non-limiting application, namely, authentication in a mobile device. Embodiments of the disclosure, however, are not limited to such mobile device applications, and the techniques described herein may also be utilized for other of devices and applications. For example, embodiments may be applicable to authentication on a desktop computer (personal computer), a PDA, a game machine, a display, a TV set, a DVD player, an electronic dictionary, a security alarm, and the like.

In the following description of exemplary embodiments, reference is made to the accompanying drawings which form a part hereof, and in which it is shown by way of illustrating specific embodiments in which the invention may be practiced. It is to be understood that other embodiments may be utilized and structural changes may be made without departing from the scope of the present invention. For the sake of brevity, conventional techniques and components related to mobile phones and other functional aspects of portable electronic devices and the individual operating components of a device may not be described in detail herein.

Figure 1:
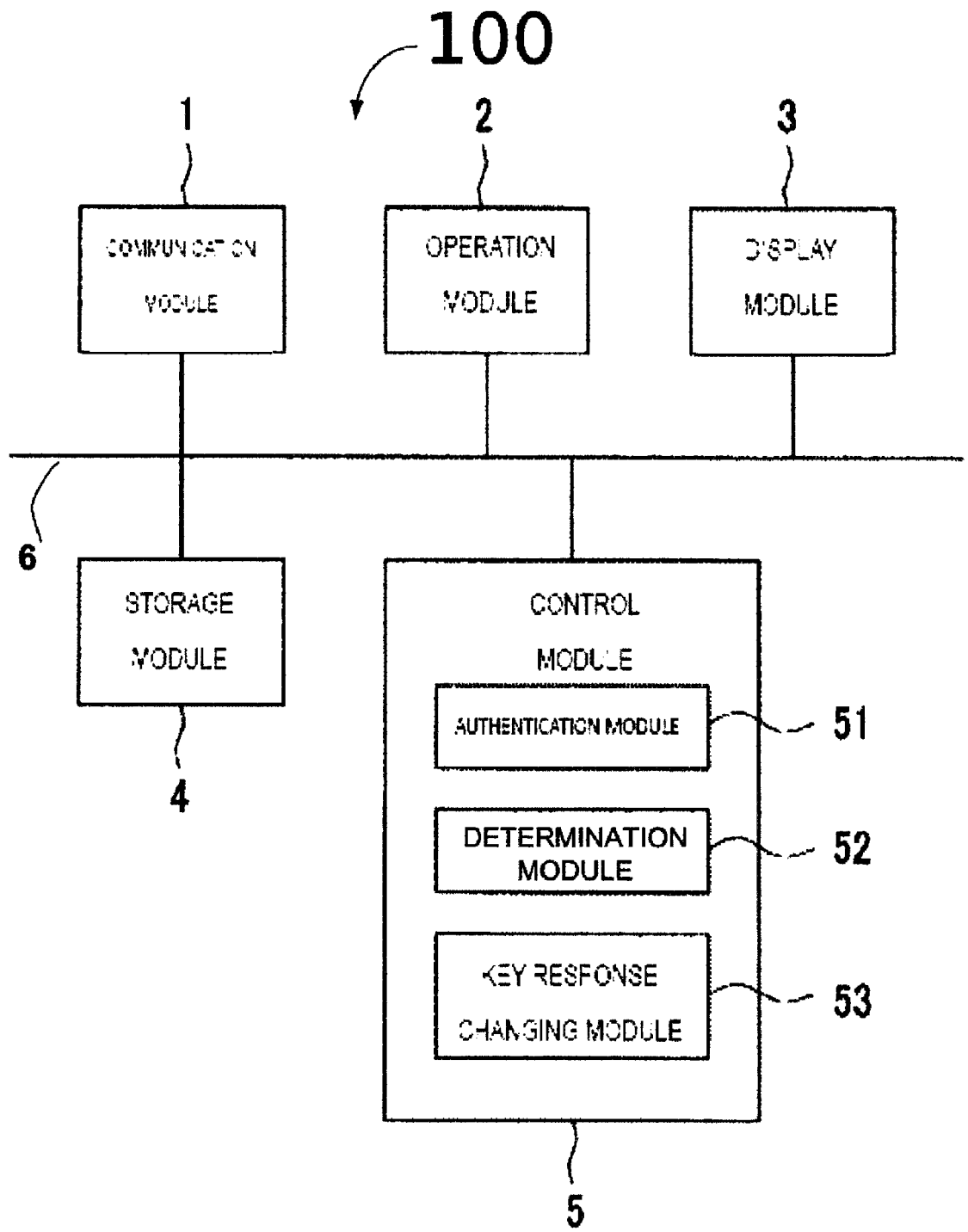
FIG. 1 is an exemplary schematic block diagram illustrating constituent elements of a mobile phone according to an embodiment of the disclosure.

FIG. 1 is an exemplary schematic block diagram of a mobile phone 100 which can be used as an authentication apparatus according to an embodiment of the disclosure. The mobile phone 100 may comprise: a communication module 1, an operation module 2, a display module 3, a storage module 4, and a control module 5. The communication module 1, the operation module 2, the display module 3, the storage module 4, and the control module 5 may be coupled to and communicate with each other via a communication bus 6.

The communication module 1 is configured to communicate with a wireless communication system (not shown) via an access point such as a base station. The communication module 1 communicates with the base station, and transmits and/or receives various kinds of data such as voice data during a voice call, mail data during transmitting/receiving mail, and web page data during webpage browsing.

The operation module 2 may comprise keys which are assigned various functions such as, for example, a power key, a communication key, a number key, a character key, a direction key, an enter key, and a transmission key. When these keys are activated by a user, a signal corresponding to one or more of the functions may be outputted to the control module 5. The operation module 2 is configured to accept an authentication password when an authentication module 51 performs authentication processing as described below.

The display module 3 may comprise an image display device such as, without limitation, a light emitting diode (LED) display, a liquid crystal display (LCD), or an organic EL display (OLED). The display module 3 may be used to display an image corresponding to images provided by the control module 5. These images may comprise, without limitation, a transmission destination telephone number when the communication module 1 of the mobile phone 100 starts a wireless communication, a transmission source telephone number when the mobile phone 100 is receiving a call, a content of a received electronic mail (e-mail) or a transmitted e-mail, a date, a time, a remaining battery level, a success or failure of transmission, a standby screen, and the like.

The storage module 4 is operable to store various kinds of data used for various processes of the mobile phone 100. In practical embodiments, the storage module 4 may comprise, for example, a non-volatile memory or storage device (non-volatile semiconductor memory, hard disk device, optical disk device, and the like), a random access storage device (for example, SRAM, DRAM), or any other form of storage medium known in the art. For example, the storage module 4 may store a computer program which is executed by the control module 5, an address book for managing personal information such as telephone numbers and e-mail addresses, an audio file for reproducing a ring tone and alarm tone, an image file for a standby screen, various kinds of setting data, a temporary data used in a program process, number of authentication failures C, and the like. The storage module 4 may be coupled to the control module 5 such that the control module 5 can read information from and write information to storage module 4. As an example, the control module 5 and storage module 4 may reside in their respective ASICs. The storage module 4 may also be integrated into the control module 5. In an embodiment, the storage module 4 may include a cache memory for storing temporary variables or other intermediate information during execution of instructions to be executed by the control module 5. The storage module 4 may use the non-volatile memory for storing instructions to be executed by the controller module 116.

The control module 5 controls overall operation of the mobile phone 100. For example the control module 5 may control transmitting/receiving of signals by the communication module 1, displaying an image in the display module 3, etc. The control module 5 may control operations of the mobile phone 100 so that processes of the mobile phone 100 are suitably performed. These processes may include, without limitation, voice communication performed over a line switching network, composing and transmitting/receiving e-mail, browsing web sites on the Internet, and the like. The control module 5 may comprise a computer (microprocessor) or another processor for performing a process based on a program (operating system, application program, etc.) stored in the storage module 4. The control module 5 may read instruction code sequentially from programs such as the operating system and the application program which are stored in the storage module 4, and perform the programs. The control module 5 may also perform procedures corresponding to operations of the operation module 2 such as activating a key.

The control module 5 comprises an authentication module 51, a determination module 52, and a key response changing module 53. The control module 5 is configured to perform an authentication processing in which authentication of a password is performed in response to a request for starting a predetermined function by the operation module 2. The predetermined function may be customized by an authenticated user. For example, the function may be customized by changing settings which preferably cannot be used by any user other than the authenticated user. The predetermined function can trigger authentication processing, and can be set, for example, by an authenticated user in advance or set during manufacturing or shipping the mobile phone 100.

Figure 2:
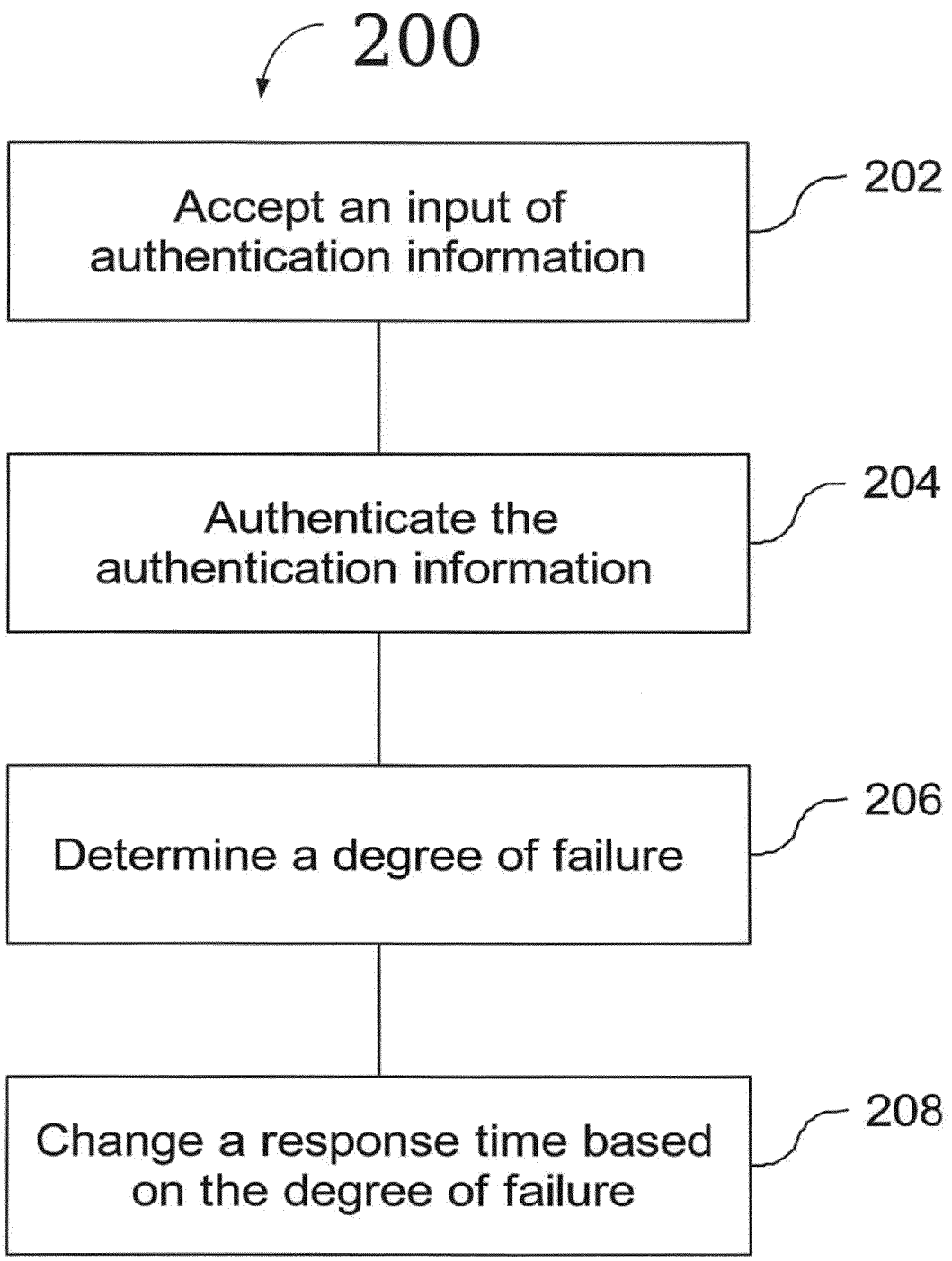
FIG. 2 is an exemplary flowchart illustrating an authentication process according to an embodiment of the disclosure.

FIG. 2 is an exemplary flowchart illustrating an authentication process 200 according to an embodiment of the disclosure. The various tasks performed in connection with process 200 may be performed by software, hardware, firmware, or any combination thereof. For illustrative purposes, the following description of process 200 may refer to elements mentioned above in connection with FIG. 1. In practical embodiments, portions of process 200 may be performed by different elements of the described system, e.g., the communication module 1, the operation module 2, the display module 3, the storage module 4, and the control module 5. Process 200 may include any number of additional or alternative tasks. The tasks shown in FIG. 2 need not be performed in the illustrated order, and process 200 may be incorporated into a more comprehensive procedures or processes having additional functionality not described in detail herein.

Process 200 may begin by accepting an input of authentication information into the operation module 2 (task 202). The authentication module 51 causes the display module 3 to display a message for prompting a user to input a password, in response to a request for starting the predetermined function by the operation module 2. As such, the request for starting the predetermined function is the trigger for starting the authentication processing. The authentication module 51 accepts an input of a password of a predetermined string of alphanumeric digits (i.e., characters, letters, numbers and the like) from a user, via the operation module 2. The input comprises authentication information.

Process 200 may continue by authenticating the authentication information inputted (task 204) by the user. The authentication module 51 may then refer to an authenticated password (correct password) which has been stored in the storage module 4 in advance, and compares it with the authentication information inputted as a string of alphanumeric digits. The authentication module 51 determines that the authentication is successfully performed if the inputted authentication information matches the authenticated password. The authentication module 51 determines that the authentication fails if the inputted authentication information does not match to the authenticated password.

The number of authentication failures C is set to one when a first failure occurs. For example, if the number of the predetermined alphanumeric digits is four, when an inputted 4-digit password is different from a correct 4-digit password, the number of authentication failures C may be first set to one, and the response is delayed corresponding to the number of authentication failures C thereafter. In another embodiment, the larger a degree of difference between a number of alphanumeric digits of the inputted password and a number of alphanumeric digits of the correct password, the larger the degree of authentication failure is determined to be, and the response may be delayed longer. For example, if there is one error, the response may be delayed by one second, and if there are two errors, the response may be delayed 1 by ten seconds.

Process 200 may continue by determining a degree of failure if it is determined that the authentication failed (task 206). In this manner, the determination module 52 counts the number of authentication failures C to obtain a degree of authentication failure. The authentication failures are determined by and indicated by the authentication module 51. The number of authentication failures C is counted from the start of the predetermined function (which causes start of the authentication processing) requested via the operation module 2. The determination module 52 stores the number of authentication failures C in the storage module 4. The number of authentication failures C stored in the storage module 4 by the determination module 52 is reset (e.g., to zero) if an authentication success is determined by the authentication module 51. In this manner, since the number of authentication failures C stored in the storage module 4 is not reset until the authentication success is determined by the authentication module 51 even when turning the mobile phone 100 off, security is increased.

Process 200 may continue by changing a response time to an operation of the operation module 2 depending on the degree of authentication failure (task 208). The key response changing module (response module) 53 performs a control in which the key response changing module 53 changes a response time (e.g., delays a response) to a next key operation to the operation module 2, based on the number of authentication failures C counted by the determination module 52. For example, a response time D from a time when a key operation is inputted to the operation module 2 to a time when a response is generated is calculated by the following relationship:

$$D = S \cdot \log_n(C+1) \quad (1)$$

where the parameter S is a coefficient which can be set arbitrarily by the authenticated user in advance, or S may be set by the operation module. S may, for example, be a security level, and the parameter C is the number of authentication failures counted by the determination module 52. In equation 1, although a base n of the logarithmic function (log) is 2, other bases for the log function can be used. For example, a common log using base 10, a natural log using base e (i.e., the transcendental number e~=2.71828183), or the like may be used.

Equation 1 may be simplified by the choice of parameters. For example:

$$D = S \cdot \log_2(C+1) \quad (2)$$

where S and C are as mentioned above, and the base (n above) of the logarithmic function (log) is 2. Equation 1 may also be simplified as follows:

$$D = \log_n(C+1) \quad (3)$$

where, the parameter S in equation 1 is set to one, and C is as mentioned above.

The response time D generated by the response module 53 in response to the key operation becomes longer logarithmically based on the number of authentication failures C. In addition, the response time D becomes longer based on the security level S which has been set by the user in advance. For example, the security level S can be set arbitrarily by the user to an integer from 1 to 10. The larger the security level, the longer the response time D. The security level S can also be, for example, a non-integer, and/or greater than or equal to 10.

In one embodiment, the response time D can be determined by multiplying an exponential function of a given base and an exponent of the number of authentication failures C by the security level S. In this case, the response time D is not as long when the number of authentication failures C is small, and the response time D increases exponentially as the number of authentication failures C increases. Therefore, an attempt by a malicious user (who may make a large number of authentication attempts) to pass the authentication will be prevented more effectively and security increased, while an authentic user (who may make a small number of mistakes) is not burdened.

Figure 3:
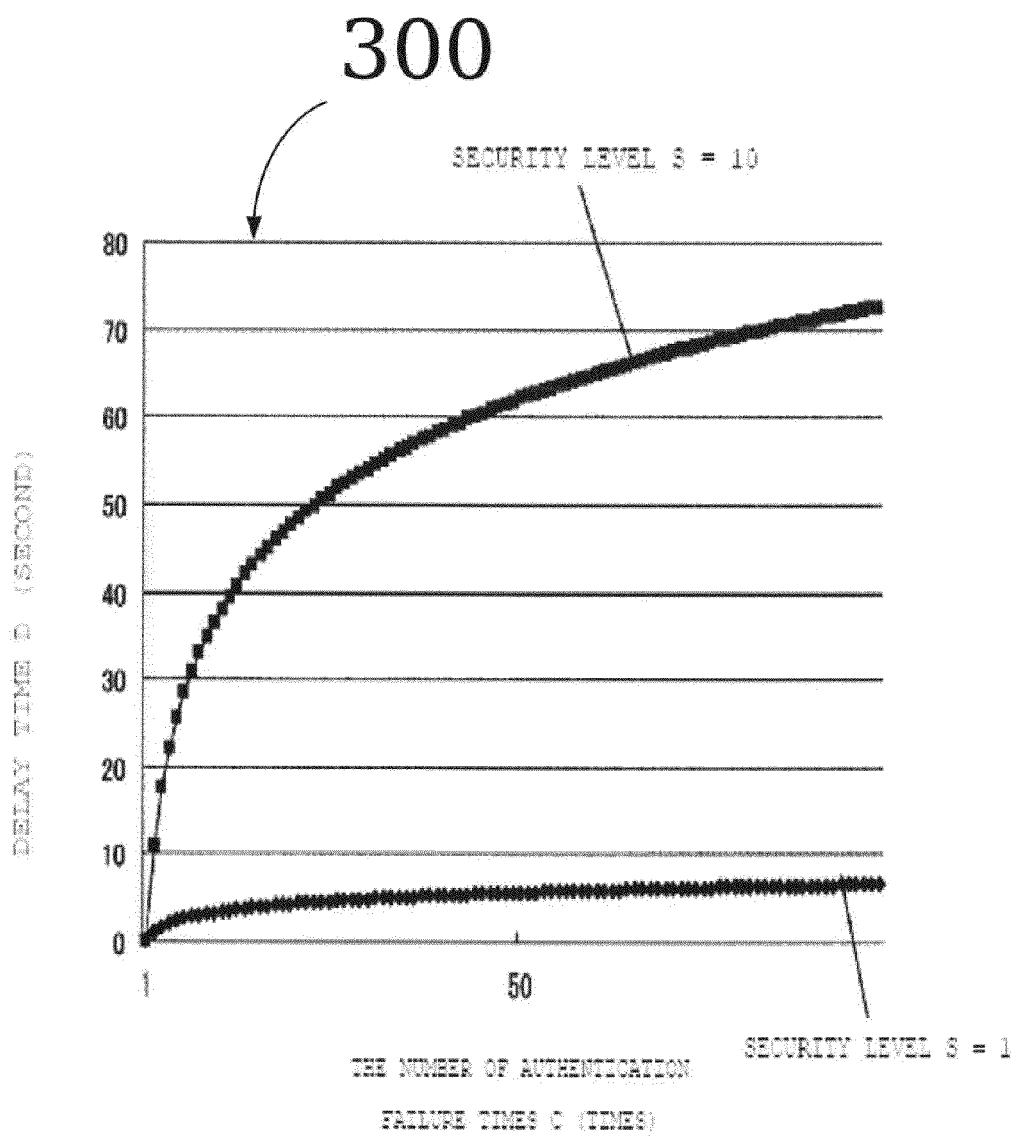
FIG. 3 is a graph illustrating a relationship between a number of authentication failures C and a response time D for a security level S of 1 and 10.

FIG. 3 shows a graph illustrating a relationship between the number of authentication failures C and the response time D for the security level S of 1 and 10. The response module 53 delays the response to a key operation on the operation module 2 by the response time D, so that it becomes highly time consuming to the point it may become impossible to input all possible numerals. Inputting all possible numerals is a brute force method for breaking into an authentication system in which all numerals (e.g., from "0000" to "9999") are input. An unauthorized user may input all possible numerals to try to perform the authentication processing of the authentication module 51. As shown in FIG. 3, after a large number of authentication failures (e.g., 50), the response time D is increased to increase the time before an unauthorized user can try inputting another number. In this manner, the unauthorized user has to wait a longer time before another input. Furthermore, the response time D becomes longer as the number of authentication failures C increases. Because of this, the security of the authentication processing of the authentication module 51 can be increased while a number of alphanumeric digits of the password remain at a predetermined number (i.e., four in this example).

In order to accommodate a password input error by an authentic user, calculation of the delay response time D can be delayed. For example, the delay response time D may not be calculated for a predetermined number of authentication failures K (for example, K=3 times). A dedicated counter may be used for a first predetermined number of authentication failures K, so that the responses are not delayed (for an authentic user). However, after the number of authentication failures C exceeds the predetermined authentication number K, the delay response time D may be calculated, and the delay processing may be performed as explained above. The a first predetermined number of authentication failures K, can be set by an authenticated user.

Figure 4:
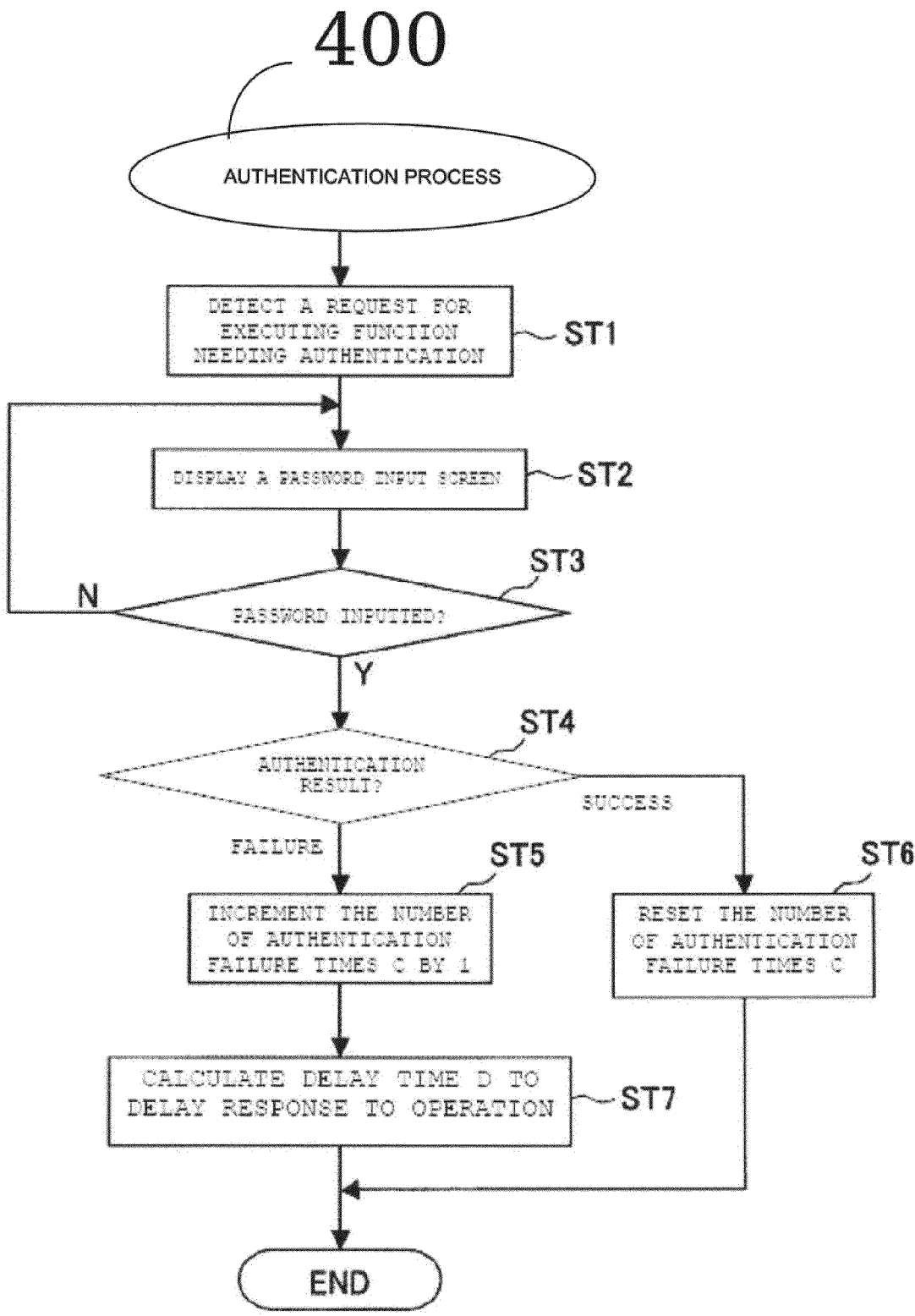
FIG. 4 is an exemplary flowchart illustrating an authentication process in a mobile phone, according to an embodiment of the disclosure.

FIG. 4 is an exemplary flowchart illustrating an authentication process 400 for execution of a function in mobile phone 100 which requires an authentication according to an embodiment of the disclosure. The various tasks performed in connection with process 400 may be performed by software, hardware, firmware, or any combination thereof. For illustrative purposes, the following description of process 400 may refer to elements mentioned above in connection with FIG. 1. In practical embodiments, portions of process 400 may be performed by different elements of the described system, e.g., the communication module 1, the operation module 2, the display module 3, the storage module 4, and the control module 5. Process 400 may include any number of additional or alternative tasks. The tasks shown in FIG. 3 need not be performed in the illustrated order, and process 400 may be incorporated into a more comprehensive procedures or processes having additional functionality not described in detail herein.

Process 400 may begin with the control module 5 detecting a request for executing a function which requires an authentication via the operation module 2 (task ST1).

Process 400 may then continue with the authentication module 51 making the display module 3 display a screen in which the user inputs a password (task ST2).

Process 400 may then continue with the control module 5 determining whether the password is inputted or not via a key operation to the operation module 2 (inquiry task ST3). If the control module 5 determines that the password has not inputted, the process 400 returns to task ST2. If the control module 5 determines that the password is inputted, the process 400 determines authentication result (inquiry task ST4).

In this manner, the authentication module 51 compares the password with the authenticated password which has been stored in the storage module 4, and performs the authentication processing (inquiry task ST4). If the inputted password corresponds to the authenticated password, and process 400 determines that the authentication succeeds (inquiry task ST4), then the determination module 52 resets the number of authentication failures C to, for example, zero (task ST6). In this manner, process 400 sets the response time back to a normal time using the response module 53, rewrites it in the storage module 4, and process 400 ends. However, if the inputted password does not correspond to the authenticated password, and process 400 determines that the authentication fails (inquiry task ST4), then the determination module 52 increments the number of authentication failures C stored in the storage module 4 by 1 (task ST5) to obtain an updated number of authentication failures C, and rewrites (stores) the updated number of authentication failures C in the storage module 4.

Process 400 may then continue with the response module 53 calculating a response (delay) time D to delay response to the key operation to the operation module 2 (task ST7). Any of the equations 1-3 mentioned above may be used. For example, the response time D may be calculated based on the number of authentication failures C, and the security level S (predetermined in advance) according to equation 2 above.

In one embodiment, the response module 53 may delay the response to the key operation to the operation module 2, when the authentication module 51 performs the password input operation. In this manner, while maintaining the security, it is possible to increase usability for the user.

In one embodiment, the number of authentication failures C is compared with a predetermined threshold value N, and the response time is delayed when the comparison result indicates $C \geq N$.

As described above, when execution of a function which requires an authentication is requested, if the authentication succeeds operations proceed normally. However, if the authentication fails, the response to key operation of the operation module 2 is delayed by the response time D after the authentication fails. The response time D increases as the number of authentication failures C increases. In this manner, if a malicious user tries to use the mobile phone 100, it becomes almost impossible to pass the authentication by the brute force method, even if the password has only four digits.

If the response time D is generated due to an authentication failure, but later the authenticated password is inputted and the authentication succeeds, then the response delay is canceled. Therefore, the security can be increased without hampering convenience of the authentic user.

In addition, as mentioned above, although the authentication module 51 performs the authentication based on the password inputted as authentication information, other authentication information may also be used. For example, the authentication apparatus may have a reading module for reading biological information such as fingerprint (accepting input). When the biological information is inputted as authentication information, the authentication may be determined by a corresponding ratio of the inputted biological information and correct biological information. For a more specific example, when an area of the inputted fingerprint information and a corresponding area of the correct fingerprint information is smaller than a predetermined ratio (for example, 60%), it is determined to be an authentication failure, and the response module 53 delays the response to the key operation to the operation module 2.

While at least one exemplary embodiment has been presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being included within the scope of the present disclosure as defined by the claims.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

Additionally, memory or other storage, as well as communication components, may be employed in embodiments of the disclosure. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

It will be appreciated that, for clarity purposes, the above description has described embodiments of the disclosure with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Throughout this disclosure, features are referred to as being "coupled" or "connected" together. Unless stated otherwise, "coupled" means that a feature is joined or communicates directly or indirectly to/with another feature. Furthermore, unless stated otherwise, "connected" means that a feature is joined or communicates directly to/with another feature. Being "coupled" or "connected" does not necessarily mean mechanically. Although the exemplary figures may depict arrangements of component features, an embodiment of the disclosure may comprise additional intervening components or features.

Although exemplary embodiments of the present disclosure have been described above with reference to the accompanying drawings, it is understood that the present disclosure is not limited to the above-described embodiments. Various alterations and modifications to the above embodiments are contemplated to be within the scope of the disclosure. It should be understood that those alterations and modifications are included in the technical scope of the present disclosure as defined by the appended claims. Furthermore, although embodiments of the present disclosure have been described with reference to the accompanying drawings, it is to be noted that changes and modifications may be apparent to those skilled in the art. Such changes and modifications are to be understood as being included within the scope of the present disclosure as defined by the claims.

What is claimed is:

1. An authentication apparatus comprising:
   an operation module operable to accept input of authentication information;
   an authentication module operable to authenticate the authentication information;
   a determination module operable to determine, by a processor, a degree of authentication failure in response to one or more authentication failures indicated by the authentication module; and
   a response module operable to change a response time based on the degree of authentication failure, wherein the response time is a time to respond to an operation of the operation module,
   wherein the degree of the authentication failure is a number of authentication failures obtained by counting the one or more authentication failures, and
   the response time is calculated based on the following relationship:

$$D = \log_n(C+1),$$

where D is the response time, C is the degree of the authentication failure, and n is a number greater than or equal to 2.

2. The authentication apparatus according to claim 1, wherein the authentication information is an inputted password.

3. The authentication apparatus according to claim 2, wherein the degree of authentication failure is determined by a difference between the inputted password and a correct password.

4. The authentication apparatus according to claim 3, wherein the difference between the inputted password and the correct password is a number of different alphanumeric digits between the inputted password and the correct password.

5. The authentication apparatus according to claim 1, wherein the authentication information is biological information.

6. The authentication apparatus according to claim 5, wherein the degree of authentication failure is determined by a corresponding ratio of the authentication information and correct biological information.

7. The authentication apparatus according to claim 1, wherein the response module is further operable to increase the response time as the degree of authentication failure increases.

8. The authentication apparatus according to claim 1, wherein the response module is further operable to change the response time if the degree of authentication failure exceeds a predetermined threshold value.

9. The authentication apparatus according to claim 1, wherein the response module is further operable to reset the response time if the authentication module determines an authentication success.

10. The authentication apparatus according to claim 1, wherein the response time is a time from when a key operation is inputted to the operation module to a time when a response is generated.

11. An authentication apparatus comprising:
an operation module operable to accept input of authentication information;
an authentication module operable to authenticate the authentication information;
a determination module operable to determine, by a processor, a degree of authentication failure in response to one or more authentication failures indicated by the authentication module; and
a response module operable to change a response time based on the degree of authentication failure, wherein the response time is a time to respond to an operation of the operation module,
wherein the degree of the authentication failure is a number of authentication failures obtained by counting the one or more authentication failures, and
the response time is calculated based on the following relationship $$D = S \cdot \log_n(C+1),$$

where D is the response time, S is a coefficient, C is the degree of the authentication failure, and n is a number greater than or equal to 2.

12. The authentication apparatus according to claim 11, wherein S is a value of security level.

13. The authentication apparatus according to claim 11, wherein S is set by the operation module.

14. The authentication apparatus according to claim 11, wherein S is set by an authenticated user.

15. An authentication method comprising:
accepting input of authentication information into an operation module;
authenticating the authentication information to determine whether one or more authentication failures occur;
determining, by a processor, a degree of authentication failure in response to the one or more authentication failures; and
changing a response time based on the degree of authentication failure, wherein the response time is a time to respond to an operation of the operation module,
wherein the degree of the authentication failure is a number of authentication failures obtained by counting the one or more authentication failures, and
the response time is calculated based on the following relationship:

$$D = \log_n(C+1),$$

where D is the response time, C is the degree of the authentication failure, and n is a number greater than or equal to 2.

16. A non-transitory computer readable medium for an authentication apparatus, comprising program code for:
accepting input of authentication information into an operation module;
authenticating the authentication information to determine whether one or more authentication failures occur;
determining a degree of authentication failure in response to the one or more authentication failures; and
changing a response time based on the degree of failure, wherein the response time is a time to respond to an operation of the operation module,
wherein the degree of the authentication failure is a number of authentication failures obtained by counting the one or more authentication failures, and
the response time is calculated based on the following relationship:

$$D = \log_n(C+1),$$

where D is the response time, C is the degree of the authentication failure, and n is a number greater than or equal to 2.

17. An authentication method comprising:
accepting input of authentication information into an operation module;
authenticating the authentication information to determine whether one or more authentication failures occur;
determining, by a processor, a degree of authentication failure in response to the one or more authentication failures; and
changing a response time based on the degree of authentication failure, wherein the response time is a time to respond to an operation of the operation module,
wherein the degree of the authentication failure is a number of authentication failures obtained by counting the one or more authentication failures, and
the response time is calculated based on the following relationship $$D = S \cdot \log_n(C+1),$$

where D is the response time, S is a coefficient, C is the degree of the authentication failure, and n is a number greater than or equal to 2.

18. A non-transitory computer readable medium for an authentication apparatus, comprising program code for:
accepting input of authentication information into an operation module;
authenticating the authentication information to determine whether one or more authentication failures occur;

determining a degree of authentication failure in response to the one or more authentication failures; and changing a response time based on the degree of failure, wherein the response time is a time to respond to an operation of the operation module, wherein the degree of the authentication failure is a number of authentication failures obtained by counting the one or more authentication failures, and the response time is calculated based on the following relationship $$D = S \cdot \log_n(C+1),$$

where D is the response time, S is a coefficient, C is the degree of the authentication failure, and n is a number greater than or equal to 2.

* * * * *